(12) United States Patent
Georgeson et al.

(10) Patent No.: US 10,976,244 B2
(45) Date of Patent: Apr. 13, 2021

(54) SURFACE INSPECTION SYSTEM, APPARATUS, AND METHOD

(71) Applicant: The Boeing Company, Chicago, IL (US)

(72) Inventors: Gary E. Georgeson, Tacoma, WA (US); Keith L. McIver, Huntington Beach, CA (US); Paul S. Rutherford, Maple Valley, VA (US)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 15/927,591

(22) Filed: Mar. 21, 2018

(65) Prior Publication Data

US 2019/0293552 A1 Sep. 26, 2019

(51) Int. Cl.
| | |
|---|---|
| *G01N 21/3581* | (2014.01) |
| *G01N 21/3563* | (2014.01) |
| *G01N 21/88* | (2006.01) |
| *G01N 21/95* | (2006.01) |

(52) U.S. Cl.
CPC ..... *G01N 21/3581* (2013.01); *G01N 21/3563* (2013.01); *G01N 21/8806* (2013.01); *G01N 21/95* (2013.01); *G01N 2201/061* (2013.01)

(58) Field of Classification Search
CPC .............. G01N 21/3581; G01N 21/95; G01N 21/8806; G01N 21/3563; G01N 2201/061
See application file for complete search history.

(56) References Cited

U.S. PATENT DOCUMENTS

| | | | |
|---|---|---|---|
| 2007/0046525 A1* | 3/2007 | Holbrook | G01S 13/89 |
| | | | 342/22 |
| 2014/0210997 A1* | 7/2014 | Blanchard | G01M 5/0016 |
| | | | 348/128 |
| 2015/0316475 A1 | 11/2015 | Rahman et al. | |
| 2016/0363543 A1* | 12/2016 | Georgeson | G01N 22/02 |
| 2017/0336323 A1* | 11/2017 | Mann | G01N 17/006 |

FOREIGN PATENT DOCUMENTS

| | | |
|---|---|---|
| CN | 106769995 | 5/2017 |
| JP | 2013213687 | 10/2013 |

OTHER PUBLICATIONS

Extended European Search Report for European Patent Application No. 19164481.4 dated Jul. 17, 2019.
Examination Report for Patent Application No. GC 2019-37219 dated Jul. 18, 2020.

* cited by examiner

*Primary Examiner* — Michael C Bryant
(74) *Attorney, Agent, or Firm* — Kunzler Bean & Adamson

(57) ABSTRACT

An apparatus for surface inspection comprises a terahertz emitter, a detector, and a computing device. The terahertz emitter is oriented to emit energy toward a surface having a surface layer disposed on the surface in a proximity of a surface feature. The detector is positioned to receive the energy from the terahertz emitter that is reflected by the surface. The computing device is in signal communication with the detector and is configured to detect the surface feature using a signal from the detector.

21 Claims, 5 Drawing Sheets

SURFACE INSPECTION SYSTEM, APPARATUS, AND METHOD

FIELD

This disclosure relates generally to surface inspection of a part, and more particularly to non-destructive surface inspection of a part.

BACKGROUND

As structures age, periodic checks to assess a state of the structure are useful to identify points of fatigue and wear. Tests may be carried out through visual inspection by a technician or other trained individual. Augmented systems, which incorporate scanners, may be used to improve detection by at least partially automating the inspection. Penetrating sealants, adhesives, and other surface layers to inspect an underlying surface using current visual and augmented inspection systems can be difficult and sometimes impossible. Often, the surface layer must be removed through use of potent chemicals or demanding manual labor. Such removal of surface layers can be expensive and time-consuming and may require a reapplication of the surface layer after inspection.

SUMMARY

The subject matter of the present application has been developed in response to the present state of the art, and in particular, in response to the problems and disadvantages associated with conventional systems, apparatuses, and methods for surface inspection. Accordingly, the subject matter of the present application has been developed to provide surface inspection apparatuses, systems, and methods that overcome at least some of the above-discussed shortcomings of prior art techniques.

Described herein is an apparatus for surface inspection. The apparatus includes a terahertz emitter, a detector, and a computing device. The terahertz emitter is oriented to emit energy toward a surface having a surface layer disposed on the surface in a proximity of a surface feature. The detector is positioned to receive the energy from the terahertz emitter that is reflected by the surface. The computing device is in signal communication with the detector and is configured to detect the surface feature using a signal from the detector. The preceding subject matter of this paragraph characterizes example 1 of the present disclosure.

The computing device is configured to identify a location of the surface feature using the signal from the detector. The preceding subject matter of this paragraph characterizes example 2 of the present disclosure, wherein example 2 also includes the subject matter according to example 1, above.

The computing device is configured to identify a degradation proximal the surface feature using the signal from the detector. The preceding subject matter of this paragraph characterizes example 3 of the present disclosure, wherein example 3 also includes the subject matter according to any one of examples 1 or 2, above.

The signal from the detector comprises at least one of a location at which terahertz energy is received by the detector, a time of flight of the energy from the terahertz emitter to the detector, a change in frequency of the energy, and a directional change in the energy. The preceding subject matter of this paragraph characterizes example 4 of the present disclosure, wherein example 4 also includes the subject matter according to any one of examples 1-3, above.

The terahertz emitter comprises a single emitter. The preceding subject matter of this paragraph characterizes example 5 of the present disclosure, wherein example 5 also includes the subject matter according to any one of examples 1-4, above.

The terahertz emitter comprises at least two emitters. The preceding subject matter of this paragraph characterizes example 6 of the present disclosure, wherein example 6 also includes the subject matter according to any one of examples 1-5, above.

The surface comprises a metallic material. The preceding subject matter of this paragraph characterizes example 7 of the present disclosure, wherein example 7 also includes the subject matter according to any one of examples 1-6, above.

The surface feature comprises a fastener. The preceding subject matter of this paragraph characterizes example 8 of the present disclosure, wherein example 8 also includes the subject matter according to any one of examples 1-7, above.

The computing device is configured to determine a stat of the surface proximal the surface feature. The preceding subject matter of this paragraph characterizes example 9 of the present disclosure, wherein example 9 also includes the subject matter according to any one of examples 1-8, above.

At least one of the terahertz emitter and the detector is couple to an end effector of a robotic arm. The preceding subject matter of this paragraph characterizes example 10 of the present disclosure, wherein example 10 also includes the subject matter according to any one of examples 1-9, above.

At least one of the terahertz emitter and the detector is coupled to a hand-operated system. The preceding subject matter of this paragraph characterizes example 11 of the present disclosure, wherein example 11 also includes the subject matter according to any one of examples 1-10, above.

Further described herein is a system for surface inspection. The system comprises a robotic arm, an end effector, and an apparatus for surface inspection. The end effector is coupled to a process end of the robotic arm. The apparatus for surface inspection is coupled to the end effector. The apparatus comprises a terahertz emitter, a detector, and a computing device. The terahertz emitter is oriented to emit terahertz energy toward a surface having a surface layer disposed on the surface in a proximity of a surface feature. The detector is positioned to receive the terahertz energy from the terahertz emitter that is reflected by the surface. The computing device is in signal communication with the detector and is configured to detect the surface feature using a signal from the detector. The preceding subject matter of this paragraph characterizes example 12 of the present disclosure.

The computing device is configured to align the apparatus for surface inspection with the surface feature. The preceding subject matter of this paragraph characterizes example 13 of the present disclosure, wherein example 13 also includes the subject matter of example 12, above.

The end effector is configured to rotate the apparatus for surface inspection during an inspection of the surface. The preceding subject matter of this paragraph characterizes example 14 of the present disclosure, wherein example 14 also includes the subject matter of examples 12 or 13, above.

A tool is coupled to the end effector to perform an operation at the surface. The preceding subject matter of this paragraph characterizes example 15 of the present disclosure, wherein example 15 also includes the subject matter according to any one of examples 12-14, above.

The surface layer comprises at least one of a sealant, a paint, and an adhesive. The preceding subject matter of this paragraph characterizes example 16 of the present disclosure, wherein example 16 also includes the subject matter according to any one of examples 12-15, above.

The robotic arm is attached to an independently positionable mobile device. The preceding subject matter of this paragraph characterized example 17 of the present disclosure, wherein example 17 also includes the subject matter according to any one of examples 12-16, above.

Further described herein is a method for surface inspection. The method comprises positioning an apparatus for surface inspection relative to a surface having a surface layer disposed on the surface. The method further comprises emitting a terahertz energy to impinge on the surface through the surface layer. The method further comprises detecting terahertz energy reflected from the surface. The method further includes detecting a surface feature of the surface through the surface layer based on an analysis of the reflected terahertz energy. The preceding subject matter of this paragraph characterizes example 18 of the present disclosure.

The method further comprises repositioning the apparatus for surface inspection to align with the surface feature and detecting a state of the surface proximal the surface feature. The preceding subject matter of this paragraph characterizes example 19 of the present disclosure, wherein example 19 also includes the subject matter according to example 18, above.

The surface feature comprises a fastener. The preceding subject matter of this paragraph characterizes example 20 of the present disclosure, wherein example 20 also includes the subject matter according to any one of examples 18 or 19, above.

The method further comprises positioning a tool at the surface feature and performing an operation with the tool. The preceding subject matter of this paragraph characterizes example 21 of the present disclosure, wherein example 21 also includes the subject matter according to any one of examples 18-20, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
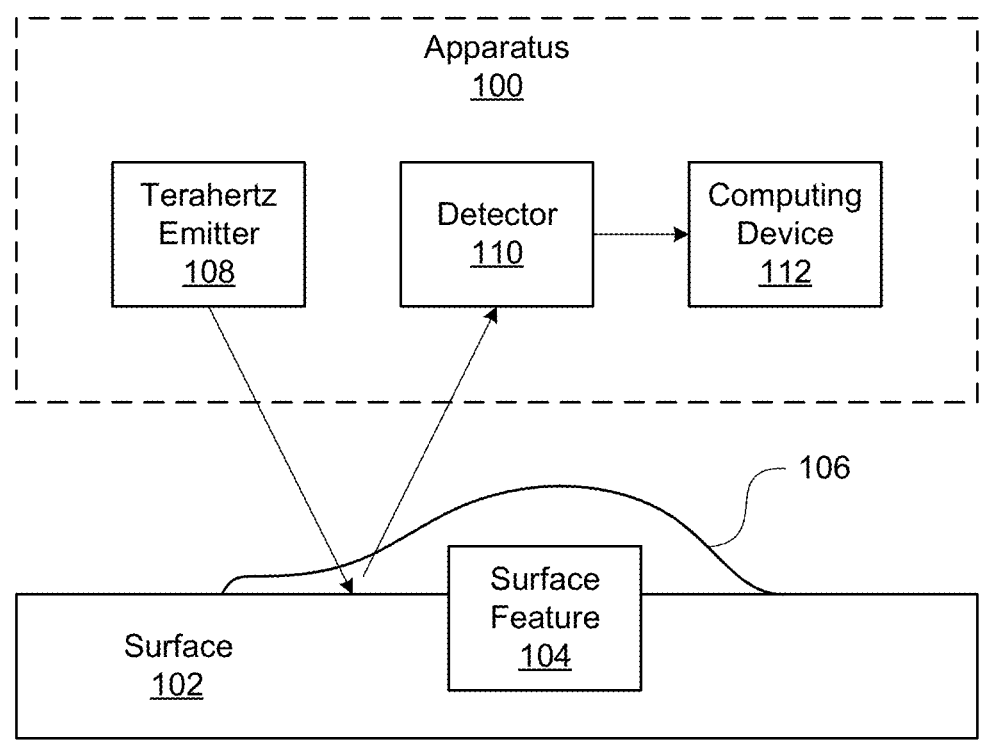
FIG. 1 is a block diagram of an apparatus for surface inspection according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Described herein are embodiments which relate to surface inspection apparatuses, systems, and methods. Surface inspection can be hindered by a surface layer such as a layer of sealant, adhesive or other relatively thick layer applied onto a surface. In some examples, thinner surface layers such as paint and other coatings may obscure inspection and hide cracks, corrosion, and other degradations in the surface. For example, sealant may be applied near (e.g., over) joints, seams, fasteners, and other surface features to improve wear characteristics, provide aesthetic properties, reduce penetration of moisture, air, chemicals, or the like, and provide various other functions. However, during inspection using ultrasound systems, eddy current systems, or the like, surface layers deposited on the surface prevents effective inspection for and identification of degradation in the surface or surface feature such as corrosion, cracking, chemical damage, leaks, wear, etc.

Embodiments described herein utilize energy emitted in the terahertz range. The terahertz energy is directed towards a surface. A surface layer may be disposed on the surface proximal a surface feature. A detector may be positioned to receive the terahertz energy as at least a portion of the terahertz energy is reflected by the surface. The detector may generate a signal based on the reflected terahertz energy and communicate the signal to a computing device. The computing device may detect the surface feature using the signal from the detector.

In some embodiments, the computing device may identify a location of the surface feature and initiate an inspection around a proximity of the surface feature for degradation, such as damage or flaws. The signal from the detector may be used by the computing device to identify a type of surface feature. For example, the surface feature may be a fastener, joint, seam, or the like. The signal may also be used to detect degradation in the surface such as cracking, corrosion, wear, contamination, or the like. At least a portion of the terahertz energy passes through the surface layer and impinges on the surface. The surface reflects the terahertz energy back through the surface layer and at least a portion of the reflected terahertz energy impinges on the detector. The detector creates a signal based on the characteristics of the reflected energy. The computing device analyzes the signal and correlates the characteristics with a detected condition such as a surface status, a type or location of a surface feature, degradation of the surface or surface feature, thickness of the surface layer, quality of the surface layer, or the like.

Additional operations may also be performed. For example, one operation may include aligning the emitter and detector with the surface feature. The operation may also include use of a tool. For example, the operation may include trimming the surface layer, replacing the surface layer, preparing the surface or the surface feature for repair, making a repair, or the like. Further detail is described below with reference to the various figures.

FIG. 1 is a block diagram of an apparatus 100 for surface inspection according to one or more examples of the present disclosure. In the illustrated embodiment, the apparatus 100 is positioned relative to a surface 102. For example, the surface 102 may be a surface of a vehicle or other machine, a building or other structure, a biological system, or a geological system. The surface 102 may be smooth or have a surface texture or treatment. The surface 102 may be made at least partially of natural or synthetic materials. For example, the surface 102 may include materials which are metallic, plastic, or composite. In some embodiments, the surface 102 is an external or internal surface of an aircraft. For example, the surface 102 may be an interior surface of a fuel tank.

The illustrated embodiment of the surface 102 includes a surface feature 104. The surface feature 104 may be a fastener, a joint, a seam, or the like. The surface feature 104 may be formed in, coupled to, or applied onto the surface 102. In some embodiments, the surface feature 104 forms an associated stress concentrator on the surface 102. The stress concentrator may be a hole, slot, adhesion, weld, or the like which increases stresses in the surface 102 at the surface feature 104. In some embodiments, the stress concentrator aspect may facilitate or accelerate degradation (e.g., cracking, corrosion, fatigue, or the like) of the surface 102.

In the illustrated embodiment, a surface layer 106 is disposed on the surface 102 in a proximity of the surface feature 104. The surface layer 106 may include a sealant, an adhesive, an insulator, a conductor, a locker, a catch or wear protection, or other functional or aesthetic media or arrangements. In the illustrated embodiments, the surface layer 106 fully encloses the surface feature 104. Alternatively, the surface layer 106 may partially enclose the surface feature 104. For example, the surface layer 106 may be disposed at a joint or of union of the surface feature 104 and the surface 102.

In some examples, the surface layer 106 is a sealant, the surface feature 104 is a fastener, and the surface 102 is the inside of a fuel tank and defines an interior surface of the fuel tank. In these examples, the surface layer 106 prevents corrosion of the surface feature 104 and prevents leakage of the fuel past the surface 102 (e.g., through seams between the surface feature 104 and the surface 102). In some examples, the surface feature 104 is a joint or seam at which two portions of the surface 102 are joined. In other examples, the surface feature 104 is a union at which a structural member is joined to the surface 102.

In the illustrated embodiment, the apparatus 100 includes a terahertz emitter 108, a detector 110, and a computing device 112. The terahertz emitter 108 directs terahertz energy to the surface 102. The terahertz emitter 108 may generate the terahertz energy in response to an input signal. The input signal may be provided by the computing device 112 or another component. The terahertz emitter 108 may provide the terahertz energy in response to reaching a distance threshold to at least one of the surface 102, the surface feature 104, and the surface layer 106. The terahertz emitter 108 may be fixed or adjustable to change the direction in which the terahertz energy is directed. At least a portion of the terahertz energy from the terahertz emitter 108 passes through the surface layer 106, reflects off the surface 102, and returns towards the apparatus 100.

The apparatus 100 includes the detector 110. The detector 110 is positioned to receive energy, from the terahertz emitter 108, that is reflected by the surface 102. The detector 110 receives and detects the terahertz energy reflected from the surface 102 and generates a signal based on the reflected terahertz energy. The detector 110 may be a single detector or an array of detectors. The detector 110 may be coupled to the terahertz emitter 108. The detector 110 may record a firing time of the terahertz emitter 108 which corresponds to a time at which the terahertz emitter 108 begins directing terahertz energy to the surface 102. Other metrics and considerations may be recorded by the detector 110 through connection to the terahertz emitter 108.

The detector 110 may be configured to move relative to the terahertz emitter 108. For example, the detector 110 may be mounted in the apparatus to facilitate movement of the detector 110 to receive reflected energy from the surface 102 in response to a change of angle in the terahertz emitter 108 relative to the surface 102. The detector 110 may be adjustable to at least one of translate parallel to the surface 102, move orthogonal to the surface 102, and angularly displace relative to the surface 102. In some examples, the detector 110 may be positioned to avoid directly reflected terahertz energy and positioned to received scattered terahertz energy corresponding to a surface feature 104 or a degradation in the surface 102 or the surface feature 104. Additionally, the gain or sensitivity of the detector 110 may be adjusted accordingly.

The illustrated embodiment of the apparatus 100 includes a computing device 112. The computing device 112 is coupled to the detector 110 to receive the signal from the detector 110 and detect a change in the terahertz energy. The change in the terahertz energy may include a location on the detector 110 at which the terahertz energy is received, a time of flight of the terahertz energy from the terahertz emitter 108 to the detector 110, a frequency shift or change in phase of the terahertz energy, an attenuation in the terahertz energy, a scattering of the terahertz energy, and the like.

Each of these detected characteristics may correspond with one or more potential conditions or metrics relating to at least one of the surface 102, the surface feature 104, and the surface layer 106. In some examples, a combination of changes in the terahertz energy is indicative of a characteristic of at least one of the surface 102, the surface feature 104, and the surface layer 106.

While the computing device 112 is shown as receiving a signal from the detector 110, the computing device 112 may also send a return signal to the detector 110. Additionally, the computing device 112 may include one-way or two-way communication with the terahertz emitter 108. In some embodiments, the computing device 112 controls at least one operation of the terahertz emitter 108. For example, the computing device 112 may communicate with the terahertz emitter 108 to calibrate the terahertz energy, adjust an alignment of the terahertz emitter 108, adjust a timing of firing the terahertz energy, or the like.

In the illustrated embodiment, the computing device 112 is shown relatively near the detector 110 and the terahertz emitter 108. However, the Figures provided herein are not to be interpreted as having any particular scale. The computing device 112 may be positioned local to the detector 110 and the terahertz emitter 108 in the apparatus 100. Alternatively, the computing device 112 may be positioned remote to the detector 110 and the terahertz emitter 108. In some examples, positioning the computing device 112 local to the detector 110 and the terahertz emitter 108 provides a more mobile apparatus 100 and a smaller overall package size. In other examples, positioning the computing device 112 remote to the detector 110 and the terahertz emitter 108 reduces the size of the apparatus 100 near the surface 102 which may allow the apparatus 100 to inspect areas that are more difficult to access or have tighter spatial restrictions.

While a single computing device 112 is shown, embodiments may include two or more computing devices 112 located at the same or distinct locations within the apparatus 100. For example, each of the terahertz emitter 108 and the detector 110 may have dedicated computing devices 112. In some embodiments, the computing device 112 communicates with a system external to the apparatus 100. For example, the computing device 112 may communicate with a network. The network may include other computing devices such as a control device for positioning the apparatus 100.

The computing device 112 may at least one of generate and store a map, model, or other depiction of the surface 102. The depiction of the surface 102 may be based on the signal from the detector 110. In some embodiments, the computing device 112 stores a map or model of the surface 102 and updates or verifies the map or model based on the signal from the detector 110. The computing device 112 may receive input other components of the apparatus 100 or from one or more sources external to the apparatus 100.

In some embodiments, the computing device 112 includes one or more computing devices, one or more data networks, and one or more servers. Even though a specific number of terahertz emitters 108, detectors 110, and computing devices 214 are depicted in the apparatus 100 of FIG. 1, one of skill in the art will recognize, in light of this disclosure, that any number of each component may be included in the apparatus 100.

The computing device 112 of the apparatus 100 may include one or more of a desktop computer, a laptop computer, a tablet computer, a smart phone, a security system, a smart watch, tracker, or other wearable device, an optical head-mounted display (e.g., a virtual reality headset, smart glasses, or the like), a proximity sensor, a pressure sensor, a thermal sensor, an image sensor, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, a plurality of computing devices 112 on one or more apparatuses 100 are communicatively coupled to one or more other computing devices 112. The computing devices 112 may include processors, processor cores, and/or the like that are configured to execute various programs, program code, applications, instructions, functions, and/or the like.

In various embodiments, components of the apparatus 100 may be embodied as a hardware appliance. In certain embodiments, the apparatus 100 may include a hardware device such as a hand-held device, robotic end effector, or other hardware appliance device (e.g., a tool head, a network appliance, or the like) that communicates with a device, a laptop computer, a server, a tablet computer, a smart phone, an inspection system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the apparatus 100 may include a power interface, a wired and/or wireless network interface, a graphical interface that attaches to a display, and/or a semiconductor integrated circuit device as described below, configured to perform the functions described herein with regard to components of the apparatus 100.

The computing device 112 or other component of the apparatus 100 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the computing device 112 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the apparatus 100.

The semiconductor integrated circuit device or other hardware appliance of the apparatus 100, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the apparatus 100 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

In some embodiments, the apparatus 100 communicates data over a data network. The data network, in one embodiment, includes a digital communication network that transmits digital communications. The data network may include a wireless network, such as a wireless cellular network, a local wireless network, such as a Wi-Fi network, a Bluetooth® network, a near-field communication ("NFC") network, an ad hoc network, and/or the like. The data network may include a wide area network ("WAN"), a storage area network ("SAN"), a local area network (LAN), an optical fiber network, the internet, or other digital communication network. The data network may include two or more networks. The data network may include one or more servers, routers, switches, and/or other networking equipment. The data network may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers, in one embodiment, may be embodied as blade servers, mainframe servers, tower servers, rack servers, and/or the like. The one or more servers may be configured as mail servers, web servers, application servers, FTP servers, media servers, data servers, web servers, file servers, virtual servers, and/or the like. The one or more servers may be communicatively coupled (e.g., networked) over a data network with one or more computing devices 112. The one or more servers may store data associated with a computing device 112.

Figures 2A, 2B:
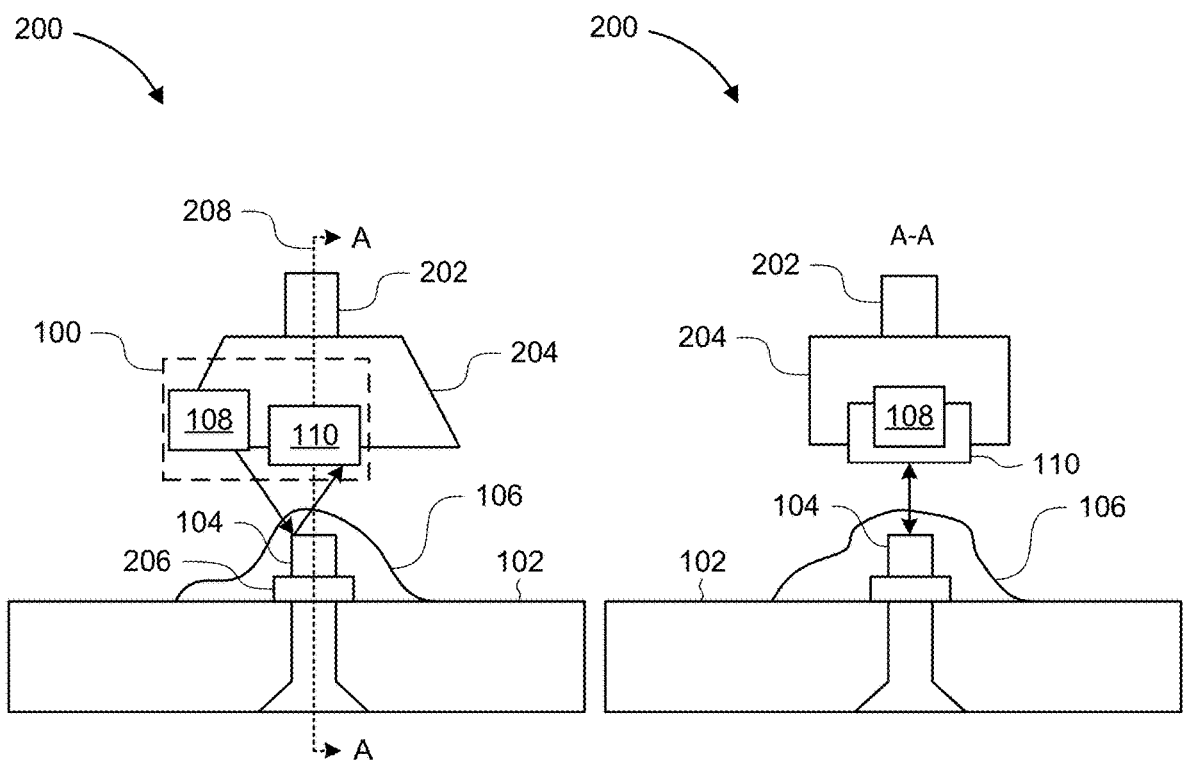
FIG. 2A is a block diagram of a system for surface inspection, according to one or more examples of the present disclosure.
FIG. 2B is a block diagram of a cross-sectional view of the system of FIG. 2A, according to one or more examples of the present disclosure.

FIG. 2A is a block diagram of a system 200 for surface inspection, according to one or more examples of the present disclosure. The illustrated embodiment includes a robotic arm 202. The illustrated embodiment also includes an end effector 204 coupled to a process end of the robotic arm 202.

The end effector 204 includes an apparatus 100. The robotic arm 202 may be configured to couple to the end effector 204 to secure the apparatus 100 to the robotic arm 202.

In some embodiments, the apparatus 100 is the same or similar to the apparatus 100 described above and shown in FIG. 1. The illustrated embodiment of the apparatus 100 includes a terahertz emitter 108 and a detector 110. In the illustrated embodiment, the robotic arm 202 positions the end effector 204 to align the apparatus 100 with a portion of the surface 102 to be inspected. The apparatus 100 may be used to locate a surface feature 104 corresponding with the surface 102. In the illustrated embodiment, the surface feature 104 is a fastener. The terahertz emitter 108 emits terahertz energy towards the surface feature 104 and/or the surface 102 and receives reflected terahertz energy at the detector 110.

In one example, the robotic arm 202 adjusts the position of the end effector 204 until the detector 110 receives reflected terahertz energy identifying the surface feature 104. The robotic arm 202 may be coupled to a mobile platform. For example, the mobile platform may include at least one of a rover, a walker, diver, and an aerial platform such as a quadcopter. The mobile platform may be at least partially manually operated or automated.

The adjustment of the position of the end effector 204 by the robotic arm 202 may correspond to a pre-programmed or dynamic search path such as a raster or other pattern. In some examples, the robotic arm 202 adjusts the position of the end effector 204 to determine a position of the surface feature 104 by locating an edge of the surface feature 104. The edge of the surface feature 104 may be an edge of the fastener as illustrated in FIG. 2A.

In the illustrated embodiment, the surface feature 104 includes a secondary surface feature 206. For example, the surface feature 104 may be a fastener and the secondary surface feature 206 may be a corresponding structure such as a washer, nut, collar, or the like. The apparatus 100 may identify the secondary feature 206 as separate from the surface feature 104 or as a component of the surface feature 104.

In the illustrated embodiment, the apparatus 100 is off-set from a center of the end effector 204. In some embodiments, an off-center position of the apparatus 100 allows the end effector 204 to be rotated to position the components of the apparatus 100 for detection of the surface feature 104 or other inspection of the surface 102. For example, because the terahertz energy is received at the detector 110 via reflection, positioning the terahertz emitter 108 and the detector 110 in some relative arrangements with respect to the surface 102, the surface feature 104, and the surface layer 106 may allow for more accurate or complete inspection.

FIG. 2B is a block diagram of a cross-sectional view of the system 200 of FIG. 2A. The illustrated embodiment shows the system 200 on the cross-section A-A 208 of FIG. 2A which is oriented 90° from the view of FIG. 2A. In some embodiments, at least one of the robotic arm 202 and the end effector may be moved in one or more of a plurality of search patterns to locate the surface feature 104 and identify an edge, center, or other geometry of the surface feature 104. For example, if the surface feature 104 is a fastener, the robotic arm 202 may raster along at least a portion of the surface 102 to detect the surface feature 104 or identify an edge or center of the surface feature 104 within the surface layer 106.

The illustrated system 200 may be coupled with another system such as a 3-D modeler, laser image detection and ranging (LIDAR), structure light, or other optical, thermal, acoustic, or impedance-based system to detect at least one of the surface 102, the surface feature, 104, and the surface layer 106. Upon detection of a candidate portion of the surface 102 or the surface layer 106 which is likely to correspond to a surface feature 104, the terahertz emitter 108 and detector 110 may be positioned to perform a non-destructive inspection. In response to completion of the inspection, the robotic arm 202 may position the end effector 204 at, or to determine, the location of the next inspection.

Figures 3A, 3B:
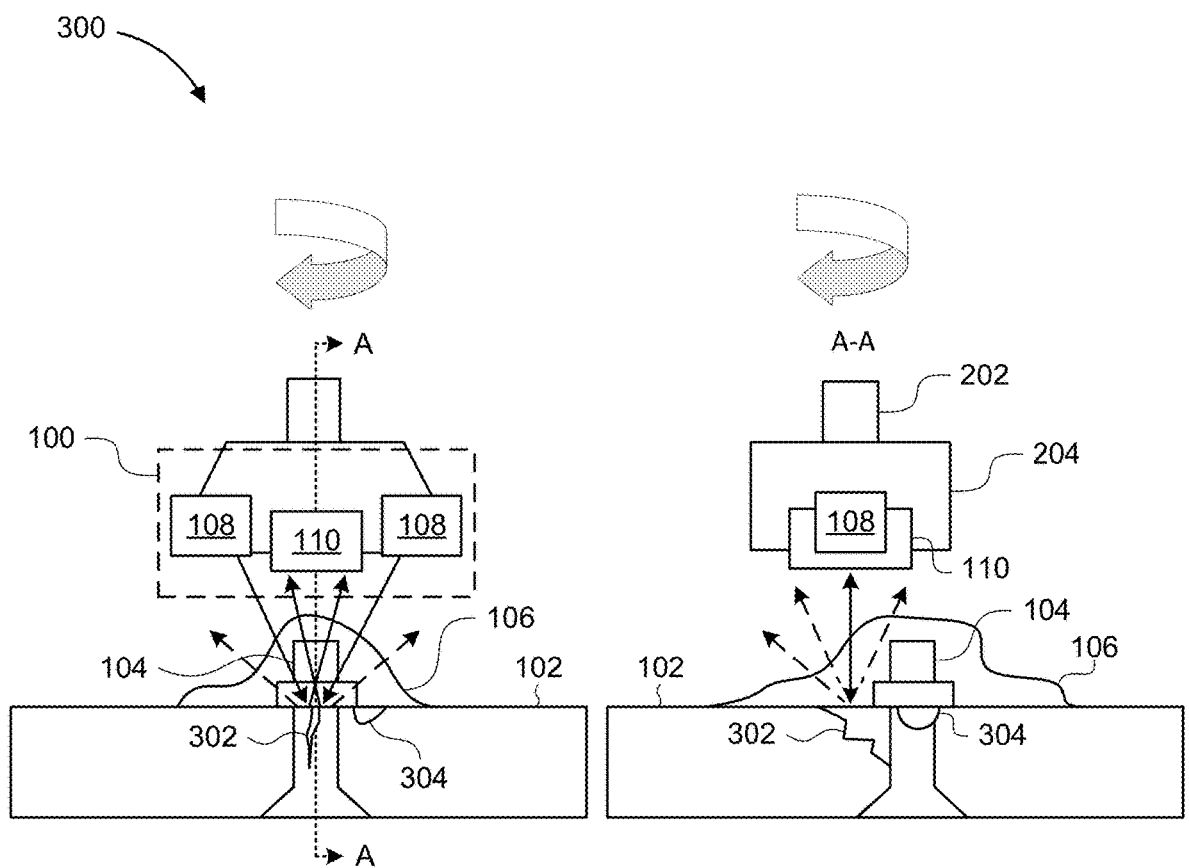
FIG. 3A is a block diagram of a system for surface inspection, according to one or more examples of the present disclosure.
FIG. 3B is a block diagram of a cross-sectional view of the system of FIG. 3B, according to one or more examples of the present disclosure.

FIG. 3A is a block diagram of a system 300 for surface inspection, according to one or more examples of the present disclosure. The illustrated embodiment includes at least two terahertz emitters 108 positioned to direct terahertz energy to the surface 102. In some embodiments, the system 300 may detect the location of the surface feature 104 on the surface 102. The system 300 may then be positioned to inspect a portion of the surface 102 proximal to the surface feature 104. In this relative arrangement, the terahertz energy from the terahertz emitters 108 may be directed to the surface 102 proximal the surface feature 104 to inspect the surface 102 for cracks 302, corrosion 304, or other degradation. The at least two terahertz emitters 108 may be positioned to direct terahertz energy to the same location or region on the surface 102 or to direct the energy to different portions or regions of the surface 102. This may allow for increased resolution or inspection speed or allow for comparative analysis to detect degradation in the surface 102.

The apparatus 100 may be rotated, as shown, to provide additional angles of impingement of the terahertz energy on the surface 102. The illustrated embodiment is shown as having a counter-clockwise rotation. However, other embodiments include clockwise rotation or variable turn directions. The apparatus 100 may be held parallel to the surface 102 or may be displaced at an angle relative to the surface 102 during inspection.

Rotation of the apparatus 100 may facilitate creation of a ring image corresponding to at least a portion of at least one of the surface 102 and the surface feature 104. The ring image may be a two or three-dimensional image depicting a state of the inspected portion.

In some embodiments, the at least two terahertz emitters 108 correspond to a single detector 110. The at least two terahertz emitters 108 may each correspond to an associated detector 110. In other embodiments, any number of terahertz emitters 108 may correspond to any number of detectors 108. The terahertz energy emitted by the terahertz emitter 108 may be scattered, reflected, or otherwise affected by the surface layer 106, the surface 102, or degradation of the surface such as the crack 302 or corrosion 304. Some of the terahertz energy may be deflected or redirected so as to miss the detector 110. The energy that does reach the detector 110 is analyzed to identify one or more characteristics of at least one of the surface 102, the surface layer 106, the surface feature 104, the crack 302, and the corrosion 304.

FIG. 3B is a block diagram of a cross-sectional view of the system of FIG. 3B, according to one or more examples of the present disclosure. The illustrated embodiment depicts a view of the system 300 of FIG. 3A rotated approximately 90° to be along the cross-section A-A. As shown, the terahertz emitter 108 directs terahertz energy to the surface 102 proximal the surface feature 104 to inspect the crack 302. At least one of the robotic arm 202 and the end effector 204 may rotate or reposition the terahertz emitter 108 and the detector 110 during the inspection.

In one example, the system 300 may perform a first inspection process to detect at least one of a surface feature 104, and a crack 302, corrosion 304, or other degradation. In response to detection of at least one of the surface feature 104 and the degradation, the system 300 may transition to a second inspection process to inspect the degradation to determine at least one of a type of the degradation, a size metric of the degradation, a location of the degradation, or other characteristics of the degradation of the surface 102 or surface feature 104 associated with the degradation.

Figure 4:
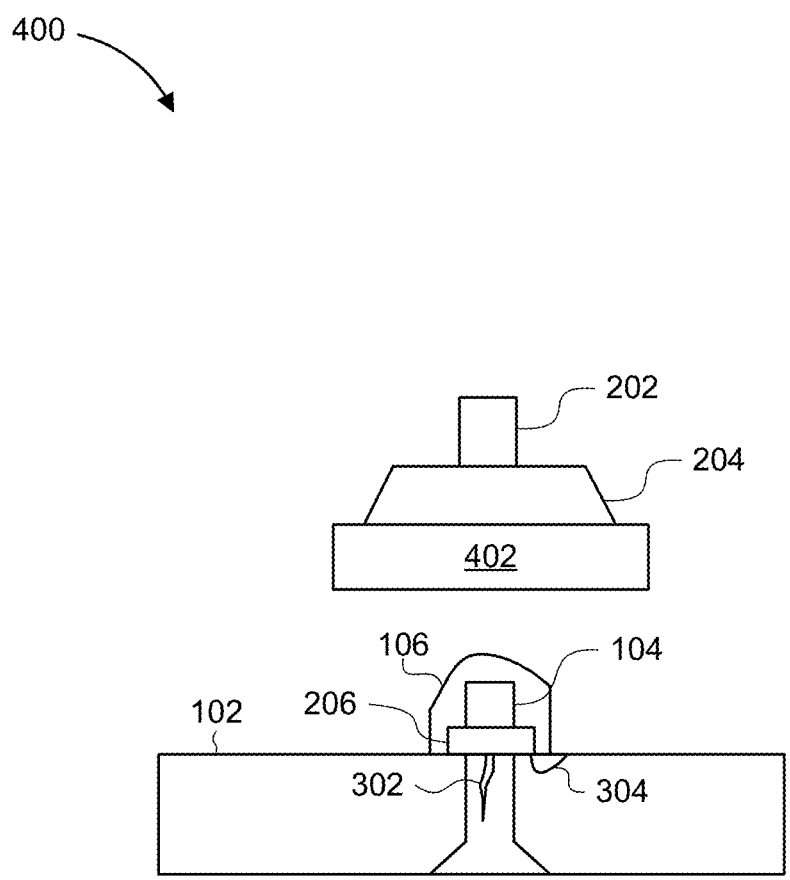
FIG. 4 is a block diagram of a system for operating a tool, according to one or more examples of the present disclosure.

FIG. 4 is a block diagram of a system 400 for operating a tool 402, according to one or more examples of the present disclosure. In the illustrated embodiment, the tool 402 is coupled to the end effector 204 which is coupled to the robotic arm 202. The end effector 204 may be specific to the tool 402 or may be a general use end effector capable of hosting other components such as the terahertz emitter 108 and the detector 110 described above. In some embodiments, the robotic arm 202 is coupled or attached to a positioning device. The positioning device may include a mobile platform. The mobile platform may have one or more degrees of freedom to position the robotic arm in a positioning operation that is separate from actuation of the robotic arm 202 itself. The mobile platform may have limited movement such as in a rail-guided platform or a cable-guided platform. The mobile platform may have free-range movement such as in a rover, crawler, submersible, or aerial platform (e.g. quad-copter). The mobile device or platform is positioned independently or in conjunction with robotic arm 202 to inspect the surface 102.

As described above, the terahertz emitter 108 and the detector 110 of the apparatus 100 may be used to determine a location of the surface feature 104. With the location of the surface feature 104 determined, the system 400 may align with the surface feature 104 to perform an operation. In the illustrated embodiment, the tool 402 is a trimming tool configured to perform a trimming operation. In the illustrated embodiment, the trimming tool 402 has performed a trimming operation to trim the surface layer 106. Trimming back the surface layer 106 may facilitate further inspection, treatment, or repair of the cracking 302 or corrosion 304 without losing the seal, insulation, protection, or other benefit of the surface layer 106 at the surface feature 104. While one example of the tool 402 is described as a trimming tool, the tool 402 may be a tool for other operations. For example, the tool 402 may be a tool for testing the integrity of the surface 102, the surface feature 104, or surface layer 106. The tool 402 may be a tool for full removal of the surface layer 106. The tool 402 may be a tool for refreshing the surface layer 106 through thermal, chemical, electrical, or mechanical operations. The tool 402 may be a tool for interfacing with the surface 102 or the surface feature 104. For example, the tool 402 may interface with the secondary surface feature 206 to tighten, reposition, or remove at least one of the surface feature 104 and the secondary surface feature 206. Other tools may be used to perform other operations.

Figure 5:
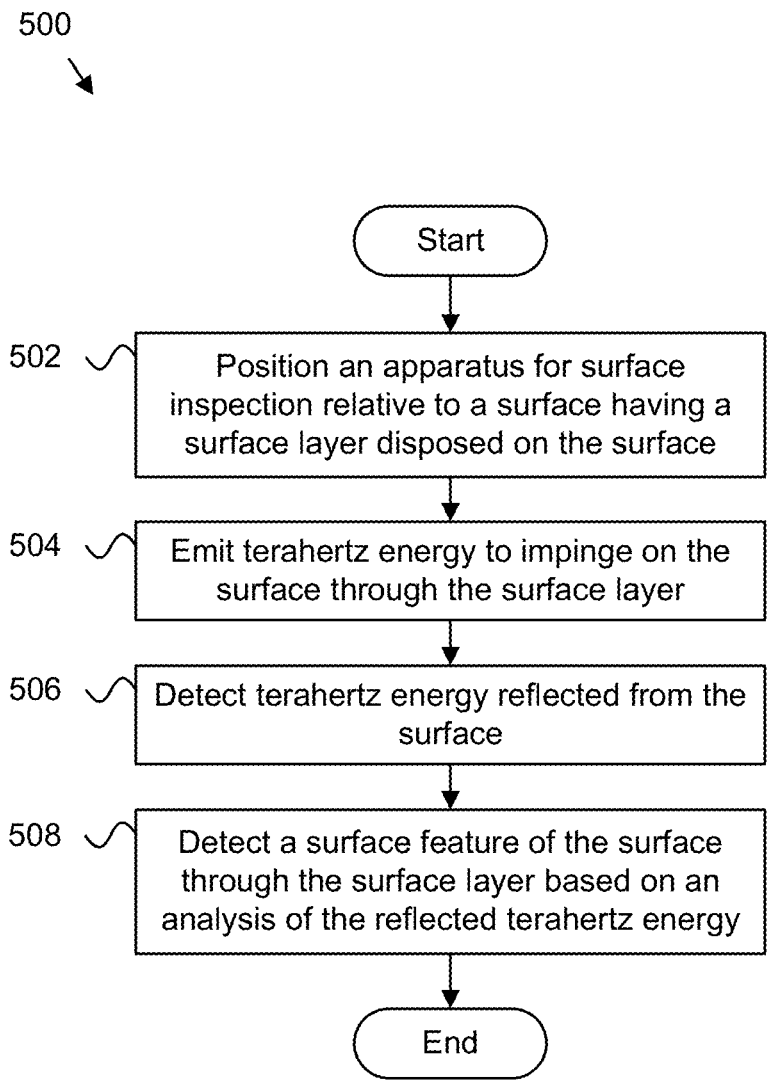
FIG. 5 is a flow diagram of a method for surface inspection, according to one or more examples of the present disclosure.

FIG. 5 is a flow diagram of a method 500 for surface inspection, according to one or more examples of the present disclosure. The method 500 begins and positions 502 an apparatus for surface inspection relative to a surface 102 having a surface layer 106 disposed on the surface 102. In some embodiments, positioning 502 the apparatus for surface inspection includes actuating, moving, or operating a coupled device. For example, positioning 502 the apparatus may include operating (e.g., moving) a robotic arm 202 or operating (e.g., moving) another positioning system which may be, or be a component of, a mobile or fixed platform such as a rover, crawler, diver, aerial device, or other platform.

The method 500, in certain embodiments, emits 504 a terahertz energy to impinge on the surface 102 through the surface layer 106. The method 500, in some embodiments, detects 506 terahertz energy reflected from the surface 102. The method 500, in embodiments described herein, detects 508 a surface feature 104 of the surface 102 through the surface layer 106 based on an analysis of the reflected terahertz energy and the method 500 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

The invention claimed is:

1. An apparatus for surface inspection, the apparatus comprising:
a terahertz emitter oriented to emit energy in a terahertz frequency range toward a surface and configured to rotate and move in a plurality of search patterns while emitting the energy in the terahertz frequency range, the surface having a surface layer disposed on the surface to be in proximity of a surface feature coupled to the surface;
a detector positioned to receive the energy in the terahertz frequency range from the terahertz emitter that is reflected by the surface; and
a computing device in signal receiving communication with the detector, wherein the computing device is configured to detect a geometry of the surface feature using a signal from the detector,
wherein:
the signal from the detector for detecting the geometry of the surface feature is based on the plurality of search patterns, and
the geometry of the surface feature comprises one of an edge and a center of the surface feature.

2. The apparatus of claim 1, wherein the computing device is configured to identify a location of the geometry of the surface feature using the signal from the detector.

3. The apparatus of claim 1, wherein the computing device is configured to identify a degradation of the surface proximal the surface feature using the signal from the detector.

4. The apparatus of claim 1, wherein the signal from the detector identifies at least one of:
a location at which energy in the terahertz frequency range is received by the detector;
a time of flight of the energy in the terahertz frequency range from the terahertz emitter to the detector;
a change in frequency of the energy in the terahertz frequency range;
an attenuation in the energy in the terahertz frequency range; and
a directional change in the energy in the terahertz frequency range.

5. The apparatus of claim 1, wherein the terahertz emitter comprises one of a single emitter and a plurality of emitters.

6. The apparatus of claim 1, wherein the computing device is configured to determine a state of the surface proximal the surface feature.

7. The apparatus of claim 1, wherein at least one of the terahertz emitter and the detector is coupled to an end effector of a robotic arm.

8. The apparatus of claim 1, where at least one of the terahertz emitter and the detector is coupled to a hand-operated system.

9. The apparatus of claim 1, wherein the computing device is further configured to detect a secondary surface feature of the surface feature.

10. The apparatus of claim 9, wherein:
the surface feature is a fastener; and
the secondary surface feature comprises one of a washer, a nut, and a collar.

11. The apparatus of claim 10, further comprising:
a tool coupled to the end effector to interface with the surface feature and perform an operation on the secondary surface feature.

12. The apparatus of claim 11, wherein:
the secondary surface feature is the nut; and
the operation performed on the secondary surface feature comprises one of tightening, repositioning, and removing the secondary surface feature.

13. The apparatus of claim 1, further comprising:
a tool coupled to the end effector to interface with the surface feature and perform an operation on the surface feature, wherein the operation performed on the surface feature comprises one of tightening, repositioning, and removing the surface feature.

14. A system for surface inspection, the system comprising:
- a robotic arm;
- an end effector coupled to a process end of the robotic arm;
- an apparatus for surface inspection coupled to the end effector, wherein the apparatus comprises:
  - a terahertz emitter oriented to emit energy in a terahertz frequency range toward a surface and configured to rotate and move in a plurality of search patterns while emitting the energy in the terahertz frequency range, the surface having a surface layer disposed on the surface to be in a proximity of a surface feature; and
  - a detector positioned to receive the energy in the terahertz frequency range from the terahertz emitter that is reflected by the surface; and
  - a computing device in signal communication with the detector, wherein the computing device is configured to detect a geometry of the surface feature using a signal from the detector,
- wherein:
  - the signal from the detector for detecting the geometry of the surface feature is based on the plurality of search patterns, and
  - the geometry of the surface feature comprises one of an edge and a center of the surface feature.

15. The system of claim 14, wherein the computing device is configured to align the apparatus for surface inspection with the surface feature.

16. The system of claim 14, wherein the surface layer comprises at least one of a sealant, a paint, and an adhesive.

17. The system of claim 14, wherein the robotic arm is attached to an independently positionable mobile device.

18. A method for surface inspection, the method comprising:
- positioning an apparatus for surface inspection relative to a surface having a surface layer disposed on the surface;
- emitting energy in a terahertz frequency range from the apparatus to impinge on the surface through the surface layer while rotating the apparatus and moving the apparatus in a plurality of search patterns;
- detecting the energy in the terahertz frequency range reflected from the surface; and
- detecting a geometry of a surface feature of the surface through the surface layer based on an analysis of the energy in the terahertz frequency range reflected from the surface,
- wherein:
  - detecting the geometry of the surface feature is based on the plurality of search patterns, and
  - the geometry of the surface feature comprises one of an edge and a center of the surface feature.

19. The method of claim 18, further comprising:
- repositioning the apparatus for surface inspection to align with the surface feature; and
- detecting a state of the surface proximal the surface feature.

20. The method of claim 18, wherein the surface feature comprises a fastener.

21. The method of claim 20, further comprising:
- positioning a tool at the surface feature; and
- performing an operation on the fastener with the tool,
- wherein the operation performed on the fastener comprises one of tightening, repositioning, and removing the fastener.

* * * * *